Dec. 7, 1937.     L. D. LOVEKIN     2,101,338
TEMPERATURE RELIEF VALVE DEVICE
Filed Jan. 4, 1935          2 Sheets-Sheet 1

WITNESS:
Rob R Kitchel

INVENTOR
Luther D. Lovekin
BY
Augustus B. Stoughton
ATTORNEY.

Patented Dec. 7, 1937

2,101,338

UNITED STATES PATENT OFFICE 2,101,338

TEMPERATURE RELIEF VALVE DEVICE

Luther D. Lovekin, Villa Nova, Pa., assignor to Kitson Company, Philadelphia, Pa., a corporation of West Virginia Application January 4, 1935, Serial No. 331

3 Claims. (Cl. 251—128)

The present invention relates to temperature limiting valve devices of the bi-metal self-closing type for the tanks or boilers of domestic open system hot water supplies.

Objects of the present invention are to provide a construction and arrangement of valve parts such that the valve can be satisfactorily opened by means of a bi-metal thermostat which, as is well known, is incapable of exerting any considerable force in respect to the water pressure to which the valves of such devices are subjected; to provide for opening and closing the valve at certain temperatures when the dead or house end of the system is closed, and for opening and closing the valve at different temperatures when hot water is being drawn at the house or dead end of the system; to oppose chattering of the valve; to provide in one fitting a single valve adapted to operate as a vent valve, a vacuum valve, and a temperature limiting valve; and in general to provide a compact, simple and reliable temperature limiting device for the purposes stated.

Other objects of the invention will appear from the following description at the end of which the invention will be claimed.

Generally stated the invention comprises the improvements to be presently described and finally claimed.

The invention also comprises a casing provided with a water-way having an opening and provided with a heat conducting metallic mass extending into the water-way, a tubular fitting mounted in said opening and provided with peripheral inlet and outlet ports arranged on opposite sides of the opening and equipped with a ball valve seat and a caged ball seated by water pressure and with a plunger chamber, and a plunger for unseating the ball valve, a bi-metal thermostat having one end mounted on said heat conducting mass and the other end aligned with the plunger, and a housing detachably connected with the casing and enclosing the thermostat and providing a hot water spill-way.

In the following description reference will be made to the accompanying drawings forming part hereof and in which, Figure 1 is a central sectional view of a device embodying features of the invention and adapted for insertion in a hot water line.

Figure 1:
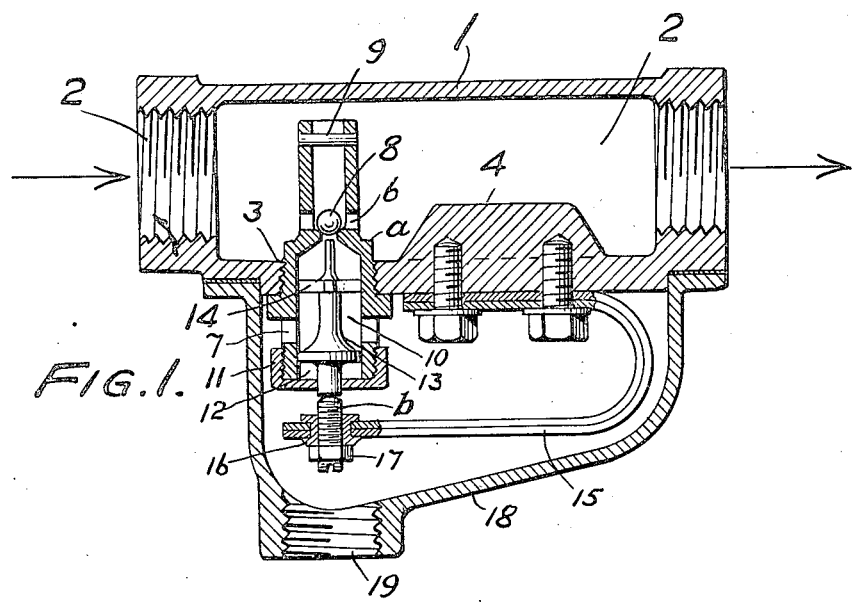

In the drawings, and referring more particularly to Figure 1, 1 indicates a casing adapted for insertion in the hot water line from the tank or boiler of a domestic open system hot water supply. The fitting 1 is provided with a water-way 2 having in the wall thereof an opening 3 shown as threaded. The casing 1 is also provided with a heat conducting mass of metal 4 extending into the water-way. a is a tubular fitting mounted in the opening 3 and provided with peripheral inlets 6 and peripheral outlets 7, of which the former are arranged in the water-way 2, and the latter are arranged outside of the water-way 2. The fitting a is provided with a seat for the ball valve 8 which is caged by the pin 9. The fitting a is also provided with a chamber 10 and with a cap 11 for closing one end of the chamber providing a dash pot cylinder 12. 13 is a plunger endwise movable in the fitting a and having a guide spider 14 and a shank outwardly tapering to provide a dash pot plunger. 15 is a bi-metal thermostat having one end mounted on the heat conducting mass 4 and having the other end provided with an adjusting screw b aligned with the plunger. The adjusting screw is mounted through a nut 16 attached to the thermostat 15. 17 is a jam nut. 18 is a housing detachably connected with the casing 1 and enclosing the thermostat 15 and it provides a spill-way 19.

The mode of operation may be described as follows:—When the temperature of water in the fluid way 2 is below a limiting temperature at which the thermostat is ineffective the pressure of the water holds the ball 8 to its seat and the parts occupy the positions indicated in Figure 1 with space between the end of the plunger and the ball. When the temperature of the water rises, the set screw is moved by the thermosat, but the plunger does not reach the ball until the temperature of the water rises to a temperature for which the device is set, then the plunger lifts the ball from its seat, thus permitting hot water to escape by the spill-way 19, which reduces the temperature of water. When the temperature of the water in the fluid-way has fallen, the thermostat resumes its original position and the ball valve 8 is again seated by the pressure of the water.

Figure 2:
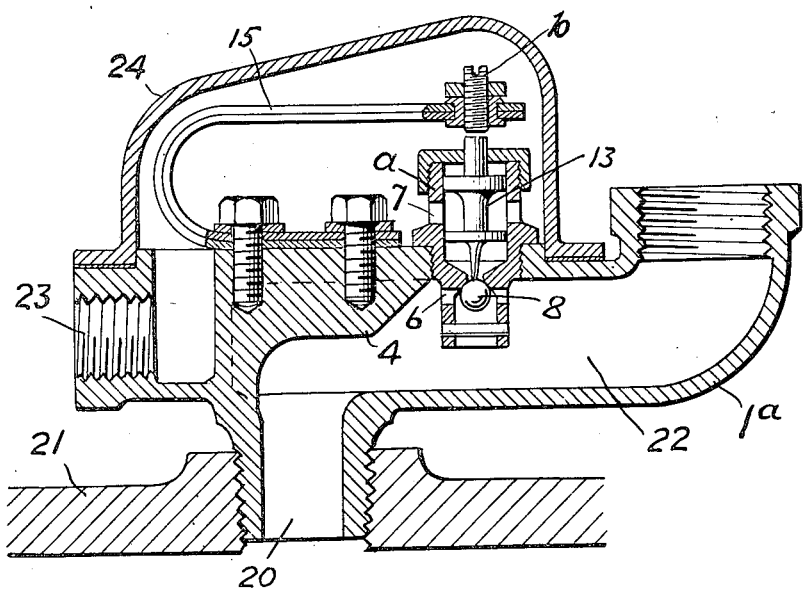
Figure 2 is a similar view illustrating a modification of the invention and adapted for application to a tank or boiler.
Figure 3:
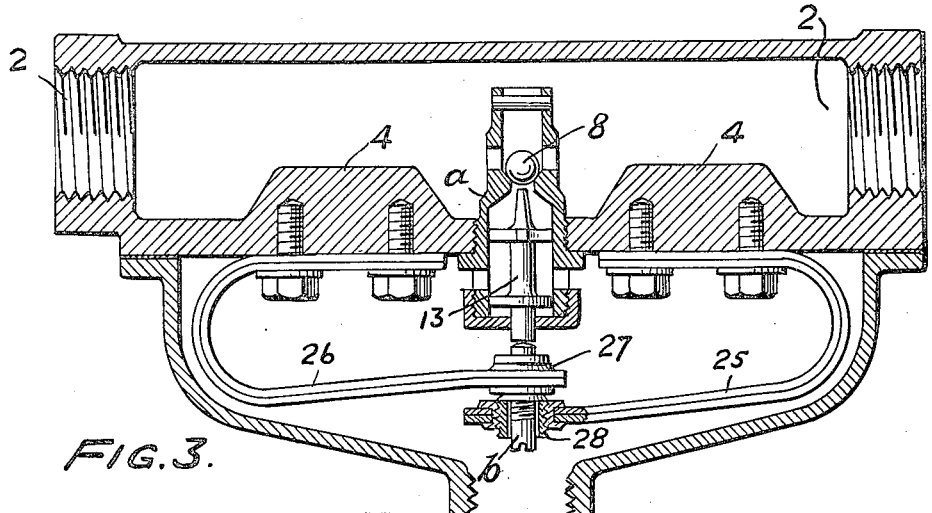
Figure 3 is a similar view illustrating the employment in the device of a pair of bi-metal thermostats.
Figure 4:
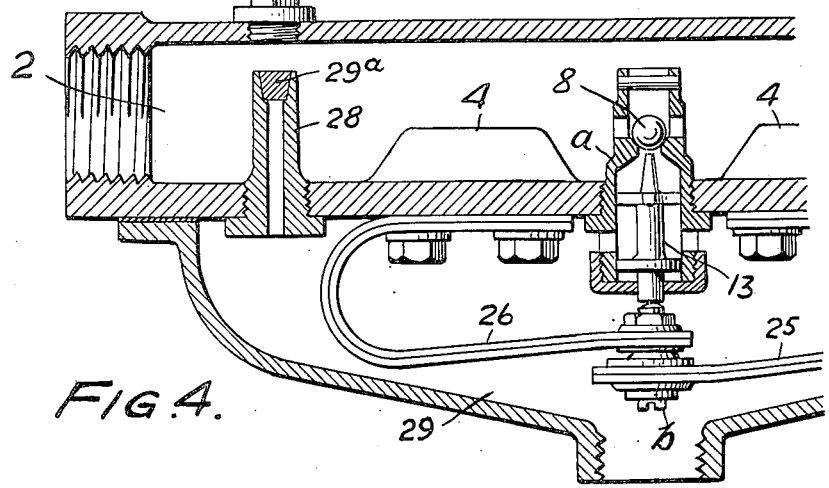
Figure 4 is a similar view illustrating a modification in which use is made of a temperature responsive fuse.

The space between the ball and plunger, Figs. 1, 3 and 4, and between the set screw b and plunger, Fig. 2, permits the thermostat to bend slightly as it is heated without opening the valve.

The construction and mode of operation of the modification shown in Fig. 2 are as above described, except as follows: If there is no flow in the fluid way, which is the case when the hot water taps are closed and the temperature of the water rises, the thermostat depresses the plunger which unseats the ball 8 and hot water enters the inlets 6 and flows out at the outlets 7 to waste with the result that the temperature of the water in the fluid way is lowered whereupon the thermostat resumes the position shown in the drawings and the ball 8 is seated. When water is flowing through the water-way 22, for example, when the hot taps are open, the operation of the parts is the same. However, in the last case the thermostat will open the valve at lower temperatures and permit it to close at higher temperatures than is the case if water is not flowing through the water-way. This is due to the fact that when water is not flowing in the water-way the metallic mass 4 serves to conduct heat from the still water to the thermostat, whereas when the water is flowing the transfer of heat to the thermostat is more effective than when the water is still, due to the greater quantity of water contacting the metallic mass 4, which gives a higher rate of heat transfer. It may be remarked that in the operation of the ball valve and its accessories jets are not formed so that the ball does not vibrate. The device operates to limit the temperature of the water and it also serves as a vacuum or vent valve because the ball is free to open the valve inwardly if the pressure in the fluid way is reduced below the pressure in the housing 18, which might occur if the water supply, for example from a tank or boiler to the casing 1, should be drawn off.

In Figure 2 the casing 1ª is provided with a nipple 20 which is adapted for insertion through the wall 21 of a tank of a domestic hot water system. The fluid way 22 extends from the nipple and discharges into the hot water supply pipes of the system. The waste way is shown at 23 and the housing 24 encloses the thermostat and provides a passage for spill water from the outlets of the ball valve to the waste 23. The construction of the fitting, thermostat and their accessories are as above described but they are arranged in inverted position. However, the pressure of water in the fluid way 22 so far exceeds the effect of gravity on the ball valve that the water pressure serves to normally seat the same, as shown in Fig. 2.

The construction and mode of operation of the modification shown in Figure 3 are as above described in connection with Figure 1 except that use is made of a pair of bi-metal thermostats 25 and 26 each connected with a metallic mass 4 that extends into the water way 2. The plunger of the valve which opens the ball valve is made in two parts (and this is true of Figure 2) of which the part 27 is connected with the thermostat 26 rigidly in the manner above described and the thermostat 25 is connected with the part 27 by a sleeve 28 which affords it some play or range of motion in respect to the thermostat 26. The object of employing a pair of thermostats is to cause the device to operate to lift the ball 8 from its seat against a relatively high fluid pressure in the water way. The power of a bi-metal thermostat is relatively small but thermostats made of thin strips of metal are more effective and by using a pair of such thermostats their lifting power is exerted upon the ball to better advantage because by their joint action they provide increased stiffness. In other words, two thermostats made of relatively thin strips of metal operate more efficiently in lifting the ball from its seat than would one thermostat made of relatively thick strips of metal.

The construction and mode of operation of the modification shown in Figure 4 are as above described in connection with Figure 3 but there is also provided an auxiliary relief tube 28 extending through the wall of the casing from the spillway or waste 29 well into the water-way of the casing, and this tube is closed by a temperature responsive fuse 29ª set to melt at a higher temperature than that at which the ball valve is opened by the thermostats. The purpose of this provision is to equip the device with a safety feature which will permit water to escape in the event of failure of the thermostats to open the ball valve.

Figure 5:
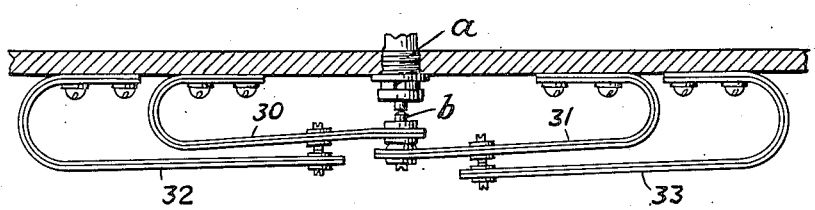
Figure 5 is a view of part of the device illustrating the use of a multiplicity of bi-metallic thermostats.

The construction and mode of operation of the modification illustrated in Figure 5 are as above described, understanding that in Figure 5 only a part of the device and its accessories are illustrated. In this modification use is made of bi-metal thermostats 30 and 31 substantially the same as the bi-metal thermostats 25 and 26 of Figure 3. In addition there are thermostats 32 and 33, the free ends of which are connected with the free ends of the thermostats 30 and 31. The function of the thermostats 32 and 33 is to exert their power in opening the ball valve and it is also to stiffen the thermostats 30 and 31, or perhaps more accurately the arms thereof, so that advantage of the thermostats of comparatively thin strips of metal is fully realized.

Although the balls used as valves are small they permit, when open, of the passage of sufficient water and in addition they do not require any more power to lift them from their seats than can be obtained from the direct application of bi-metal thermostatic devices to them without the intervention of multiplying levers or springs.

It may be remarked that the construction shown in Figure 2 constitutes a unitary structure for domestic boilers and tanks comprising a nipple for connection with the tank or boiler and a temperature limiting valve and a vacuum and vent valve, all of which is a matter of considerable economy and convenience in installation and use.

It is an advantage of a ball valve that a thermostat not only has sufficient power but also sufficient stroke for opening it or lifting its ball from its seat.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. In a valve device, the combination of, a casing having a water way therein and having an opening therein, communicating with said water way, a tubular fitting mounted in said opening and having peripheral outlets therein, a valve seat forming a portion of the walls of said tubular fitting, a ball valve mounted for co-operation with said seat, a closed cylinder forming a portion of said tubular fitting extending beyond said peripheral outlets, and a plunger mounted in said cylinder and aligned with said ball valve and movable in one direction to open said valve and in the opposite direction to gradually close communication between the interior of said cylinder and said peripheral outlets and to thereby act as a dash-pot, there being provision for lost motion between said ball valve and said plunger.

2. In a valve device, the combination of, a casing having a water way therein and an opening therein in communication with said water way, a tubular fitting mounted in said opening and having peripheral outlets therein, a valve seat forming a portion of the walls of said tubular fitting, a ball valve mounted for co-operation with said seat, a closed cylinder forming a portion of said tubular fitting mounted adjacent said peripheral outlets, a plunger mounted in said cylinder and aligned with said ball valve and movable in one direction to open said ball valve and in the opposite direction to permit said ball valve to close, said plunger having a shank tapering outward so as to direct water passing between said ball valve and said valve seat to said peripheral outlets, there being provision for lost motion between said ball valve and said plunger.

3. The combination in a device of the type specified, of waste and fluid ways having a common wall, a tubular fitting extending through the wall and having peripheral inlet openings and a ball valve seat and a ball cage in the fluid way and having peripheral discharge openings and a plunger chamber in the waste way, a ball arranged in the cage for freedom of movement and adapted to be normally seated by fluid pressure, and a plunger arranged in the chamber and provided with a spider guide and with a head co-operating with said discharge openings to form a dashpot, said plunger being arranged to operate directly on the ball, there being a provision for lost motion between the ball and plunger.

LUTHER D. LOVEKIN.